United States Patent
Keller et al.

(10) Patent No.: US 7,680,219 B2
(45) Date of Patent: Mar. 16, 2010

(54) APPARATUS AND METHOD FOR DECODING A BIT SEQUENCE FROM QPSK OR QAM SYMBOLS

(75) Inventors: Stefan Keller, Freiburg (DE); Ramon Oome, Nijmegen (NL)

(73) Assignee: Trident Microsystems (Far East) Ltd. (KY)

( * ) Notice: Subject to any disclaimer, the term of this patent is extended or adjusted under 35 U.S.C. 154(b) by 1197 days.

(21) Appl. No.: 11/136,295

(22) Filed: May 24, 2005

(65) Prior Publication Data

US 2005/0259765 A1  Nov. 24, 2005

(51) Int. Cl.
*H04L 27/06* (2006.01)
(52) U.S. Cl. .............. 375/341; 375/265; 714/780; 714/795
(58) Field of Classification Search ............. 375/262, 375/265, 341, 346, 348; 714/780, 794, 795
See application file for complete search history.

(56) References Cited

U.S. PATENT DOCUMENTS

| | | | | |
|---|---|---|---|---|
| 5,377,133 A * | 12/1994 | Riggle et al. | ............. | 708/524 |
| 5,968,198 A * | 10/1999 | Hassan et al. | ............. | 714/752 |
| 6,115,435 A | 9/2000 | Harada et al. | ............. | 375/341 |
| 6,226,333 B1 | 5/2001 | Spalink | ............. | 375/340 |
| 6,347,125 B1 * | 2/2002 | Dent | ............. | 375/341 |
| 6,424,685 B1 | 7/2002 | Messel et al. | ............. | 375/341 |
| 6,442,212 B1 * | 8/2002 | Kratochwil | ............. | 375/265 |
| 6,529,559 B2 * | 3/2003 | Reshef | ............. | 375/262 |
| 6,578,173 B2 * | 6/2003 | Alamouti | ............. | 714/792 |
| 6,611,551 B1 * | 8/2003 | Jones et al. | ............. | 375/219 |
| 6,661,282 B2 | 12/2003 | Ha et al. | ............. | 329/304 |
| 6,757,337 B2 * | 6/2004 | Zhuang et al. | ............. | 375/267 |
| 6,990,627 B2 * | 1/2006 | Uesugi et al. | ............. | 714/794 |
| 7,093,188 B2 * | 8/2006 | Maiuzzo et al. | ............. | 714/795 |
| 7,099,403 B1 * | 8/2006 | Dagdeviren | ............. | 375/296 |
| 7,120,213 B2 * | 10/2006 | Gatherer et al. | ............. | 375/347 |
| 7,280,840 B2 * | 10/2007 | Murakami et al. | ............. | 455/522 |

FOREIGN PATENT DOCUMENTS

| | | | | |
|---|---|---|---|---|
| DE | 199 62 162 | 7/2000 | ............. | 27/34 |
| EP | 1 024 634 | 8/2000 | ............. | 27/22 |
| GB | 2 355164 | 4/2001 | ............. | 27/26 |
| WO | WO 00/16528 | 3/2000 | ............. | 27/26 |

OTHER PUBLICATIONS

Lin et al. (US 2002/0114398); Aug. 22, 2002; Constellation -Multiplexed Transmitter and Receiver.*
Kang et al. (US 2003/0031278); Feb. 13, 2003; Channel Decodign Apparatus and Method in an Orthogonal Frequency Division Multiplexing System.*

(Continued)

*Primary Examiner*—Dac V Ha
(74) *Attorney, Agent, or Firm*—DLA Piper LLP (US)

(57) ABSTRACT

A bit sequence (b, b') from QPSK or QAM symbols is decoded, in which an associated receive probability (w, w') is assigned to each receive bit (b, b'). The receive probability (w, w') is adaptively determined taking into account the transfer properties of the channel.

8 Claims, 16 Drawing Sheets

OTHER PUBLICATIONS

Tosata et al. "Simplified Soft-Output Demapper for Binary Interleaved COFDM with Application to HIPERLAN/2", IEEE International Conference on Communications (ICC 2002), vol. 2, pp. 664-668, Apr. 28-May 2, 2002.

Wachsmann et al. "Multilevel Codes: Theoretical Concepts and Practical Design Rules", IEEE Transactions on Information Theory, vol. 45, No. 5, pp. 1361-1391, Jul. 1999.

Park et al. "A Demapping Method using the pilots in COFDM System", IEEE Transactions on Consumer Electronics, vol. 44, No. 3, pp. 1150-1153, Aug. 1998.

Brink et al., "Iterative Demapping and Decoding for Multilevel Modulation," IEEE Globecam, vol. 1, Nov. 8, 1998, pp. 579-584. XP000894365.

* cited by examiner

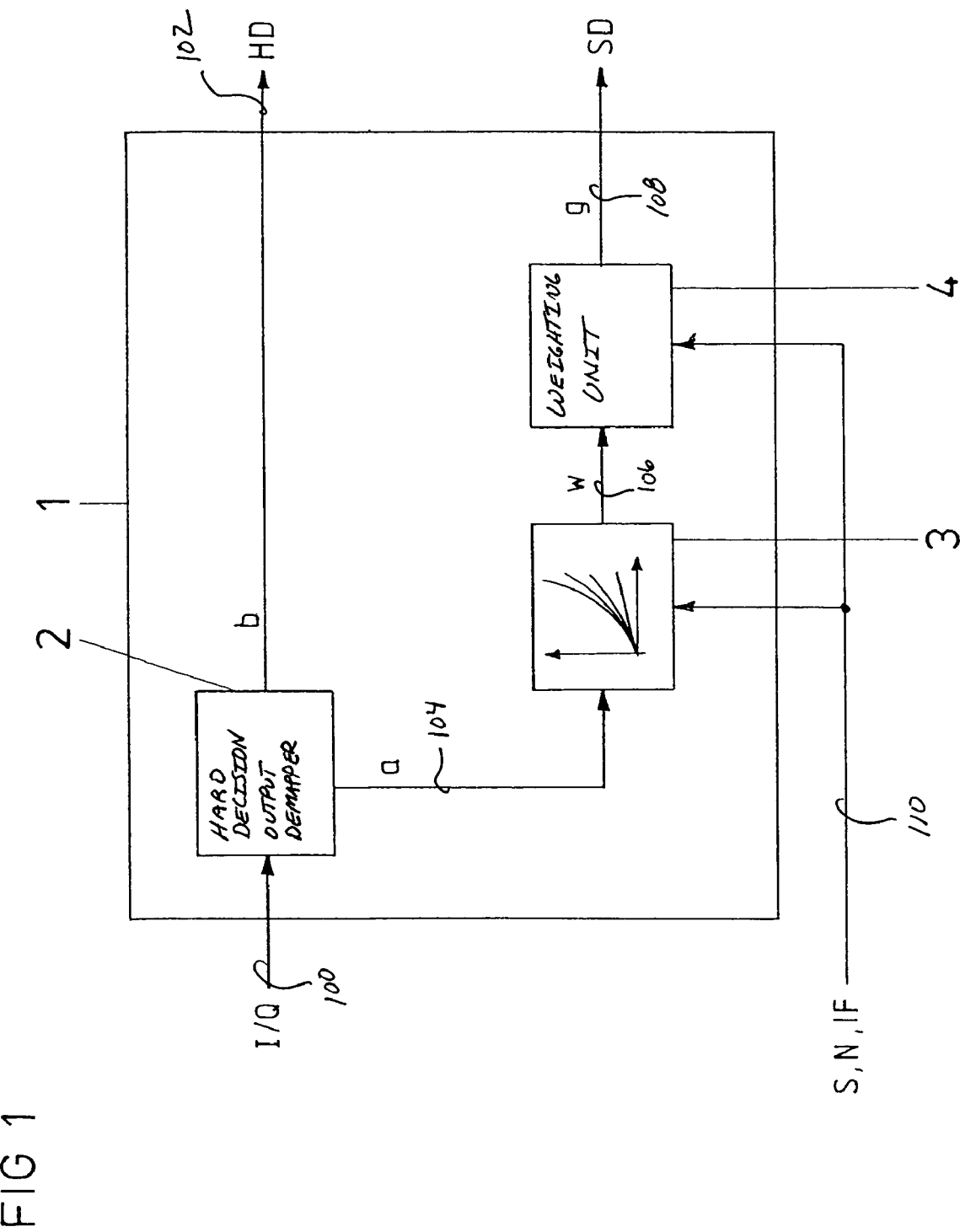

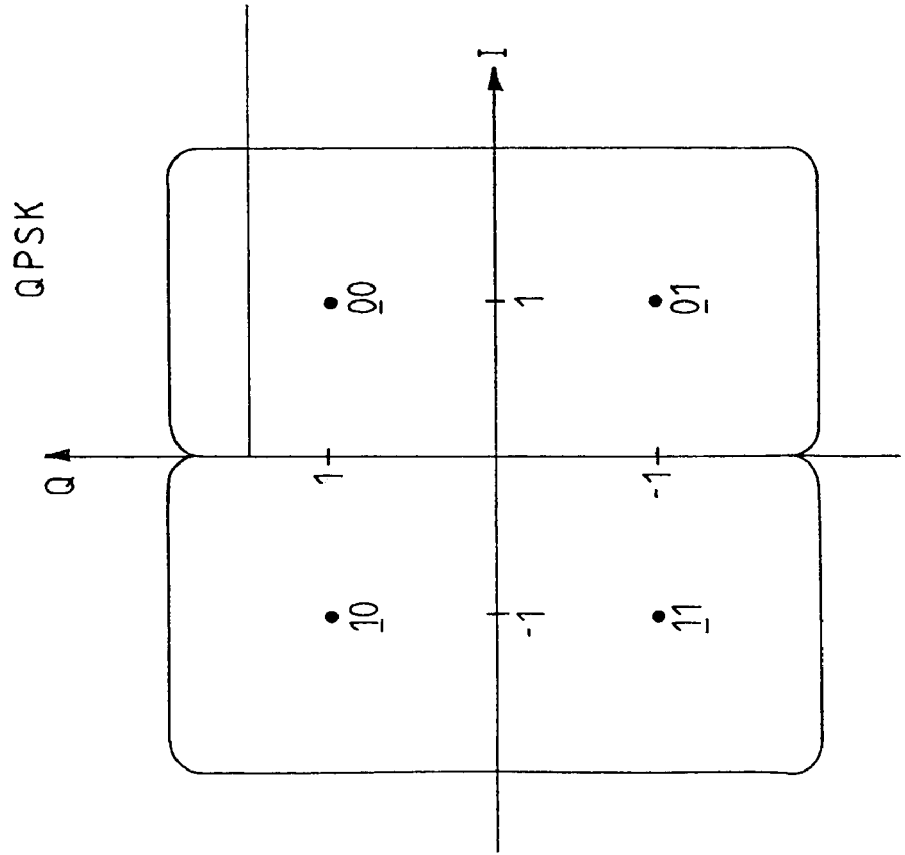
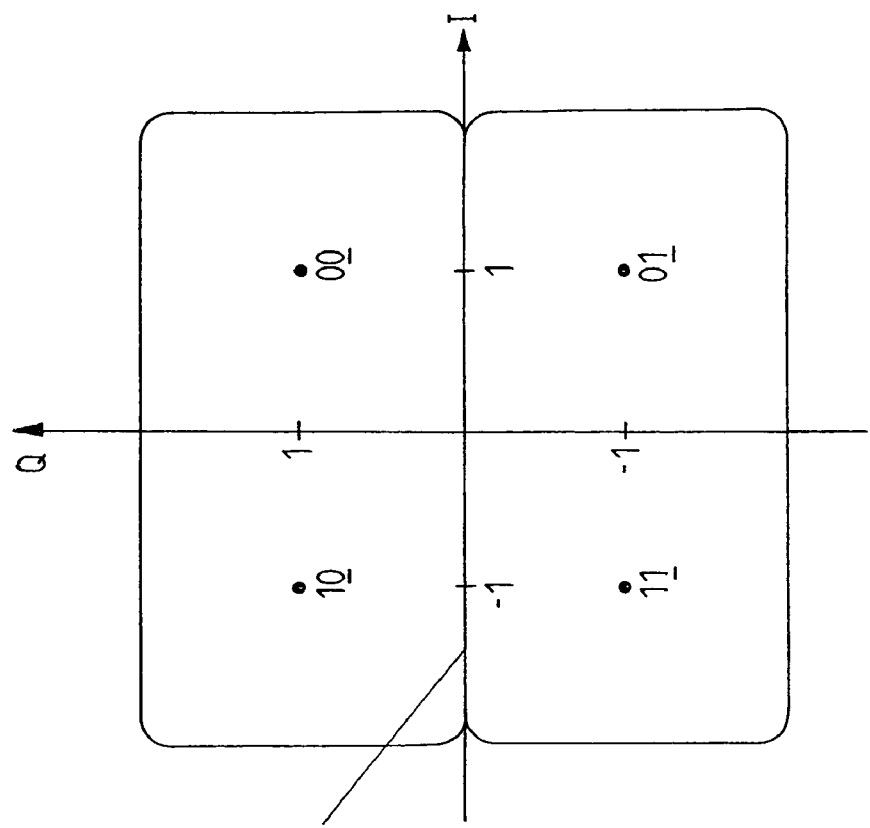
FIG 2b
FIG 2a

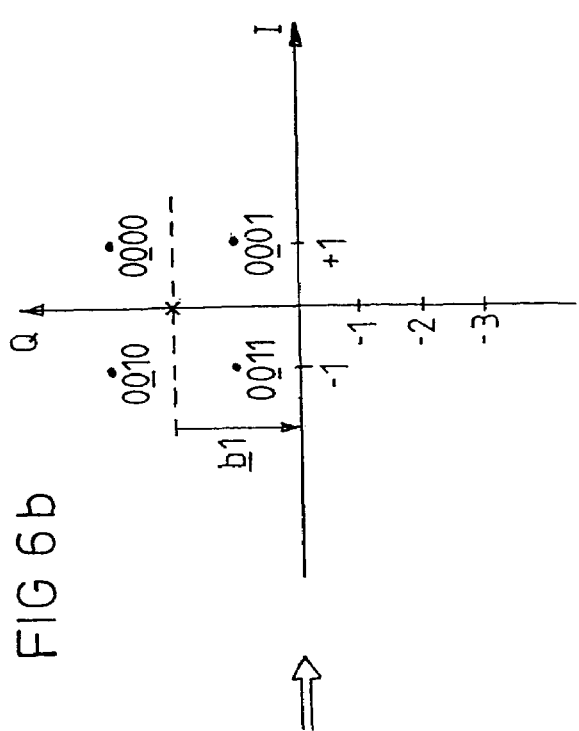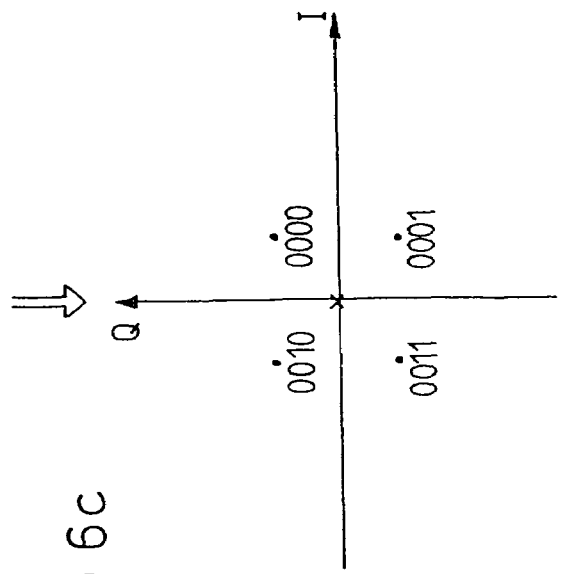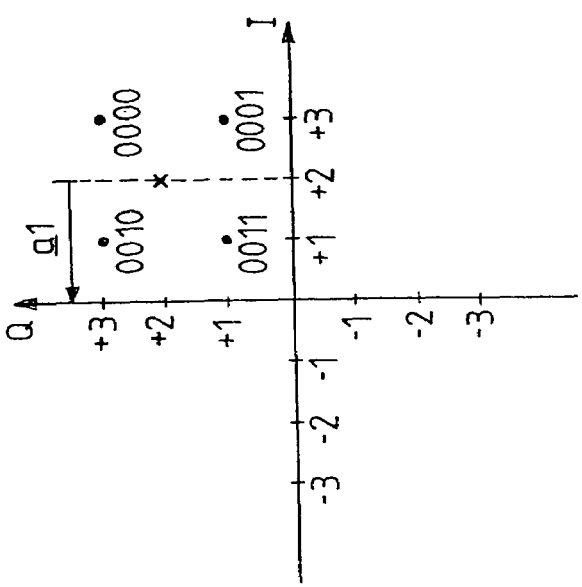
FIG 6a
FIG 6b
FIG 6c

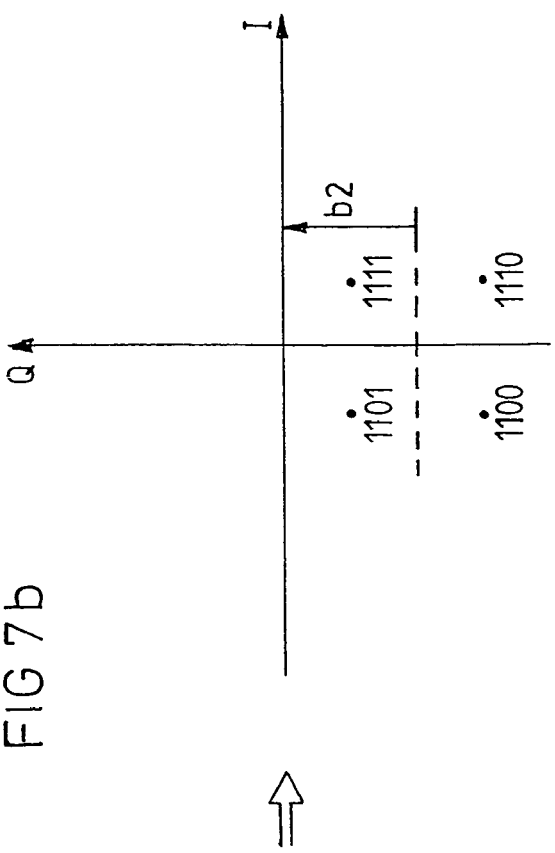
FIG 7a
FIG 7b
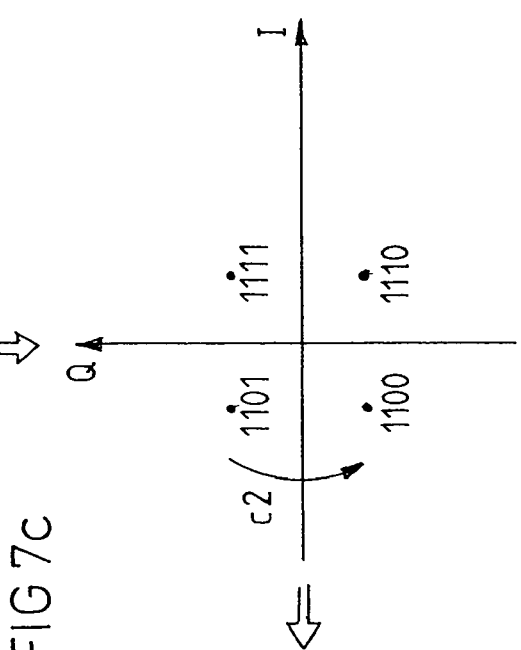
FIG 7c
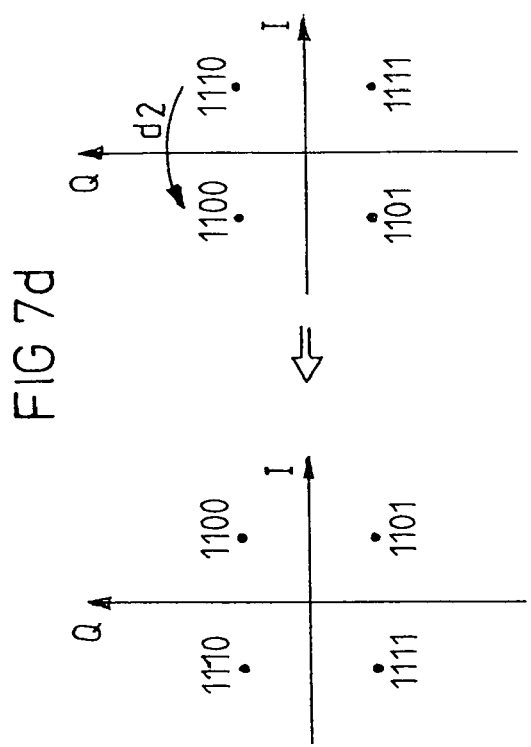
FIG 7d
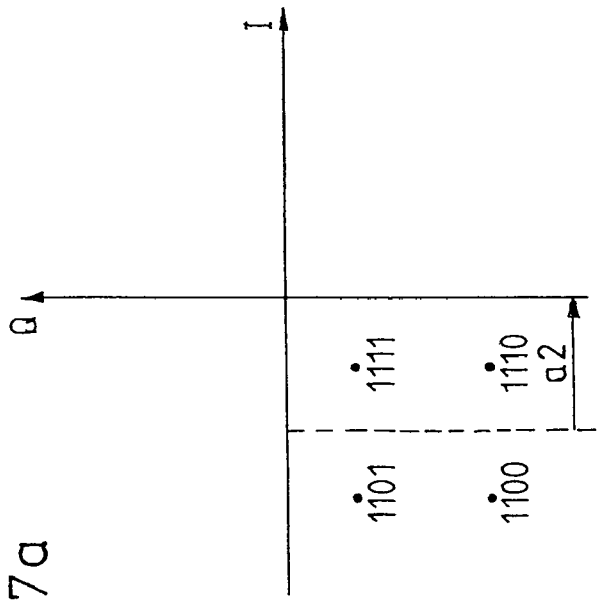
FIG 7e

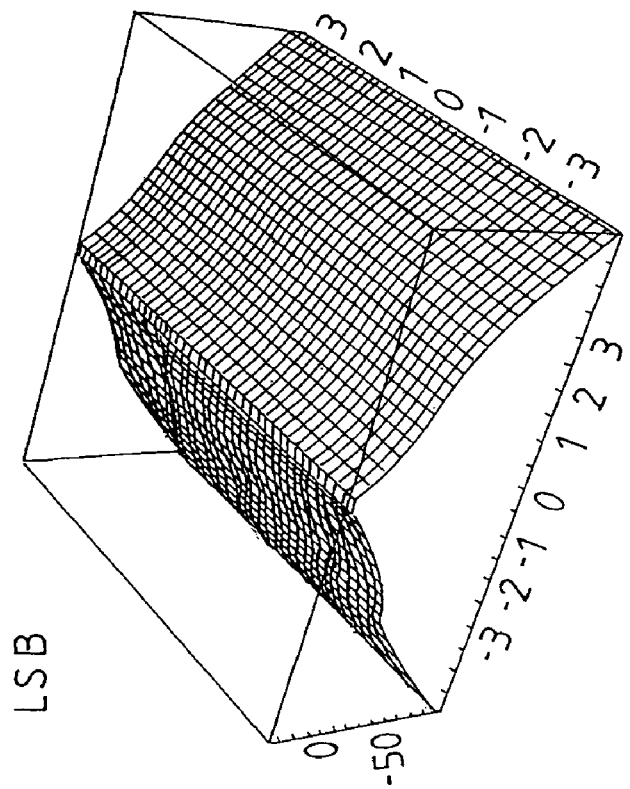
FIG 8b
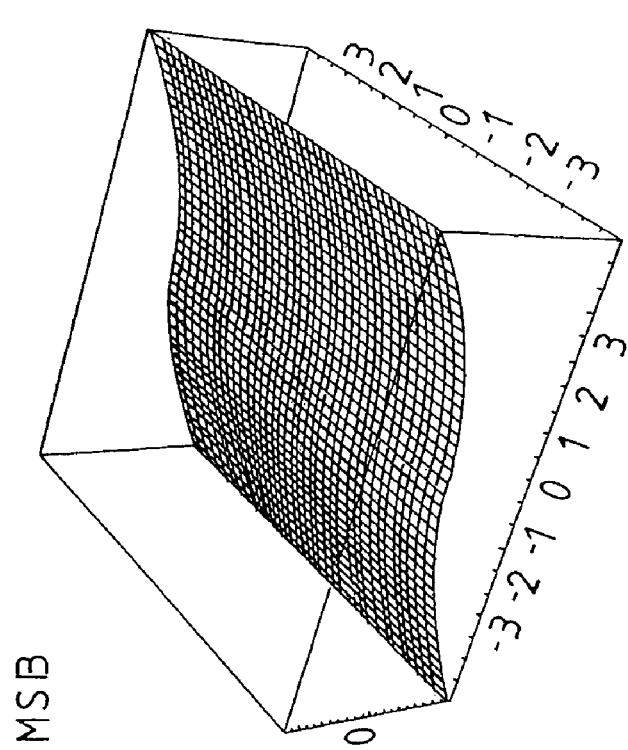
FIG 8a
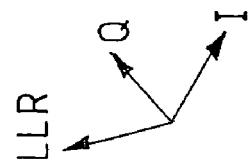

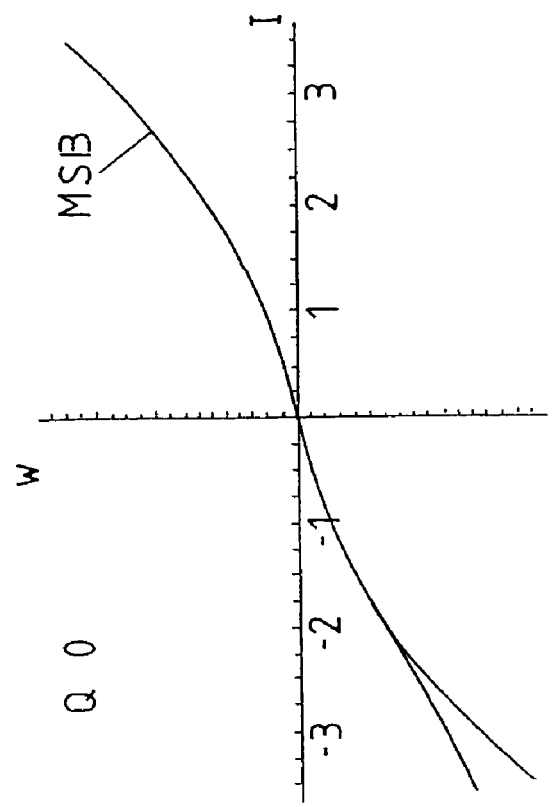
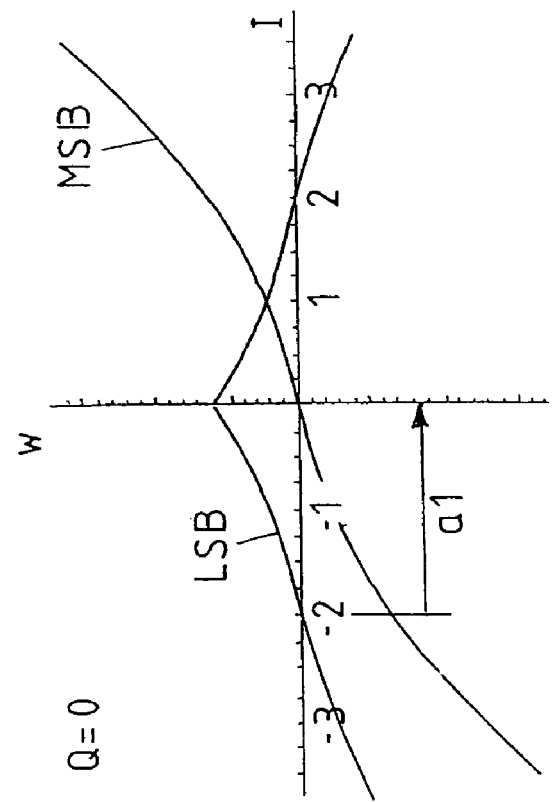
FIG 9a
FIG 9b

FIG 16 — PRIOR ART
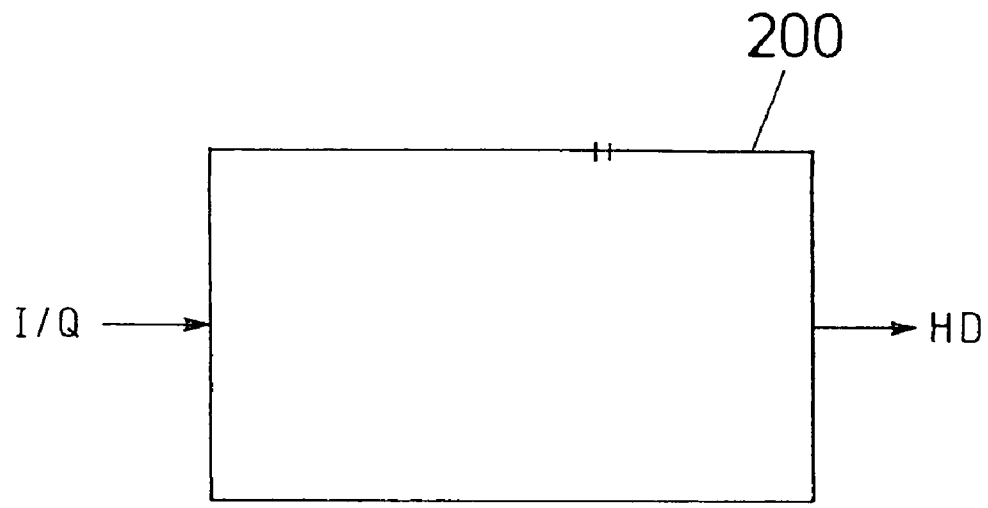
FIG 17 — PRIOR ART
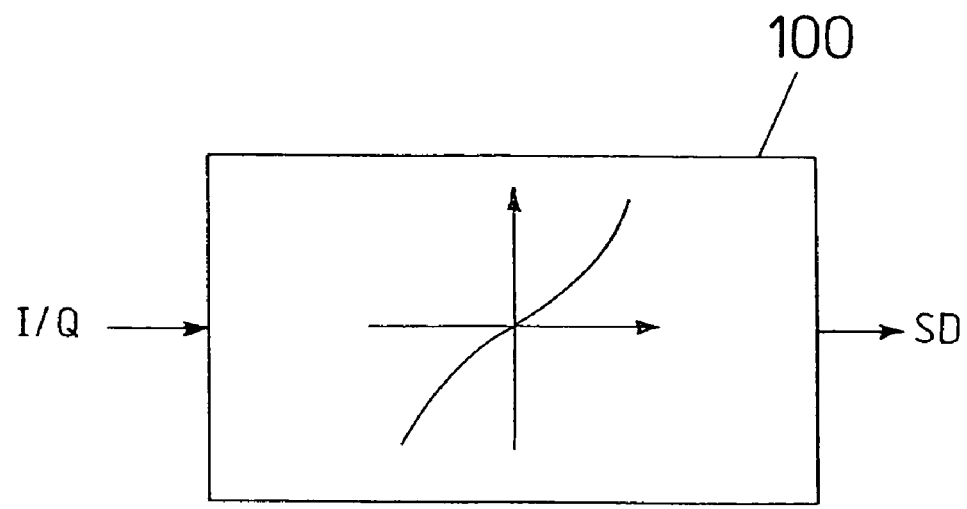

APPARATUS AND METHOD FOR DECODING A BIT SEQUENCE FROM QPSK OR QAM SYMBOLS

PRIORITY INFORMATION

This application claims priority from German application 10 2004 025 826.0 filed May 24, 2004, which is hereby incorporated by reference.

BACKGROUND OF THE INVENTION

The invention relates to a method and apparatus for decoding a bit sequence from QPSK or QAM symbols There are generally two known fundamental techniques for decoding QPSK or QAM symbols-hard demapping and soft demapping. In the hard demapping approach, the individual received QPSK or QAM signals (received vectors) are assigned based on an unambiguous decision to a constellation point (symbol vector) (see FIG. 16). With soft demapping, decoding of the received signals as data is performed, from which data and the reliability of a given decision for a specific QPSK or QAM symbol is obtained (see FIG. 17). Examples of these soft-decision-output demappers are found in U.S. Pat. Nos. 6,661,282; 6,115,435; 6,226,333 and 6,424,685 as well as the article by Tosato F., Bisoglia P. "*Simplified Soft-Output-Demapper for Binary Interleaved. COFDM with Application to HIPERLAN/2*", Research Report, Department of Electronics, University of Padova, 2001.

This soft decision decoding, which weights the demodulated data by the error probability of the data, results in an improved forward error correction. For communication systems that utilize M-level QAM, the receiver thus requires a decoding algorithm that uses a two-dimensional (complex) receive signal to calculate the corresponding soft decision values as the input signals for the channel decoder. The prerequisite to ensure the reliability of this type of system is that the correct occurrence probability parameters for a given symbol are used as the basis for calculating the corresponding soft decision values.

As a rule, the receiver operates according to the maximum likelihood principle in which the individual probabilities are each multiplied and the receive sequence with the highest overall probability is selected. The main approach to determining the required individual probabilities is to use the Euclidean distance between receive vector and the nearest ideal symbol vector. In addition, it is generally assumed that the transfer channel shows a Gaussian amplitude distribution for the noise. Given a high signal-to-noise ratio, the logarithmic maximum likelihood function for this transfer channel is assumed to be approximately represented by:

$$LLR \sim (CTF(i)^2/\sigma^2 * (\min[r(i)-\alpha_0] - \min[r(i)-\alpha_1]^2)$$

where:
i is an index for the carrier I,
CTF is a noise amplitude of the channel transfer function,
$\sigma^2$ is a noise variance in the transfer channel,
r(i) is a receive vector with the coordinates I/Q,
$\alpha_0$ is the set of constellation points that correspond to a transmitted "0" (corresponding to the "ideal" symbol vectors for a transmitted "0"), and
$\alpha_1$ is the set of constellation points that correspond to a transmitted "1" (corresponding to the "ideal" symbol vectors for a transmitted "1").

In coded orthogonal frequency division multiplexing (COFDM) systems, the soft information for the forward error correction (FEC) should for this reason be computed from the energy of the given carrier, the detected noise energy, and the probability of the corresponding constellation point.

The prior-art approach to accomplishing this starts with a fixed noise energy.

Calculation of the soft information is frequently implemented using mapping or lookup tables, see U.S. Pat. No. 6,115,435. Using this approach, the handling of the various constellations or hierarchy modes, such as those supporting, for example, DVB-T (Digital Video Broadcasting—terrestrial), specifically, 16-QAM, 64-QAM, a non-hierarchical constellation, a hierarchical constellation, et cetera, is difficult.

If, on the other hand, the decoding characteristic is calculated explicitly, the implementation is often either too complex, or significant approximation errors occur. For example, although U.S. Pat. No. 6,424,685 provides a comparatively simple calculation of the decoding characteristic from polar coordinates, considerable effort is required to adapt to the different constellations or hierarchy modes.

To simplify the decoding process, recent publications propose a transformation of the received constellation vectors into a simpler constellation arrangement. The term used here is "remapping". For example, U.S. Pat. No. 6,661,282 describes a remapping by subtraction of an offset. However, this procedure is suitable only for the 16-QAM method. However, U.S. Pat. No. 6,226,333 describes the decoding of QAM symbols from a single quadrant by employing a rotator.

Therefore, there is a need for a technique of decoding QPSK or QAM symbols in which different constellations and hierarchy modes are easily implementable. In addition, the technique should have a high degree of reliability in predicting the decoded QPSK or QAM symbols.

SUMMARY OF THE INVENTION

According to an aspect of the invention, a bit sequence (b, b') from QPSK or QAM symbols received following transmission over a channel is decoded, and an associated receive probability (w, w') is assigned to each receive bit (b, b'). The receive probability (w, w') is adaptively determined as a function of the transfer properties of the channel.

These and other objects, features and advantages of the present invention will become more apparent in light of the following detailed description of preferred embodiments thereof, as illustrated in the accompanying drawings.

BRIEF DESCRIPTION OF THE DRAWINGS

FIG. 1 is a block diagram illustration of a first system for decoding QPSK or QAM symbols (soft demapper);

FIGS. 2A-2B show partitions of the QPSK constellation, specifically (a) MSB of the in-phase coordinate, and (b) MSB of the quadrature coordinate, respectively;

FIGS. 6A-6C illustrate a rearrangement of the QAM symbols of the 16-QAM constellation (remapping) in the first quadrant of the constellation diagram, FIG. 6A illustrates the extraction state; FIG. 6B illustrates the state after shift in the Q direction by a1; and FIG. 6C illustrates the state after shift in the I direction by b1;

FIGS. 7A-7E illustrate a rearrangement of the QAM symbols of the 16-QAM constellation (remapping) in the $3^{rd}$ quadrant of the constellation diagram, FIG. 7A illustrates the extraction state; FIG. 7B illustrates the state after shift in the Q direction by a2; FIG. 7C illustrates the state after shift in the I direction by b2; FIG. 7D illustrates the state after reflection on the I axis; and FIG. 7E illustrates the state after reflection on the Q axis;

FIGS. 8A-8B illustrate the log-likelihood ratios of the MSB and LSB, respectively of the I coordinate of the non-hierarchical 16-QAM constellation of FIG. 5 (applies analogously to the MSB/LSB of the Q coordinate of the 16-QAM constellation);

FIGS. 9A-9B illustrate a section of the functions of FIGS. 8A and 8B with Q=0, and a shift of the curve for the LSB;

FIG. 16 shows a prior art hard-output demapper; and
FIG. 17 shows a prior art soft-output demapper.

DETAILED DESCRIPTION OF THE INVENTION

Figure 3:
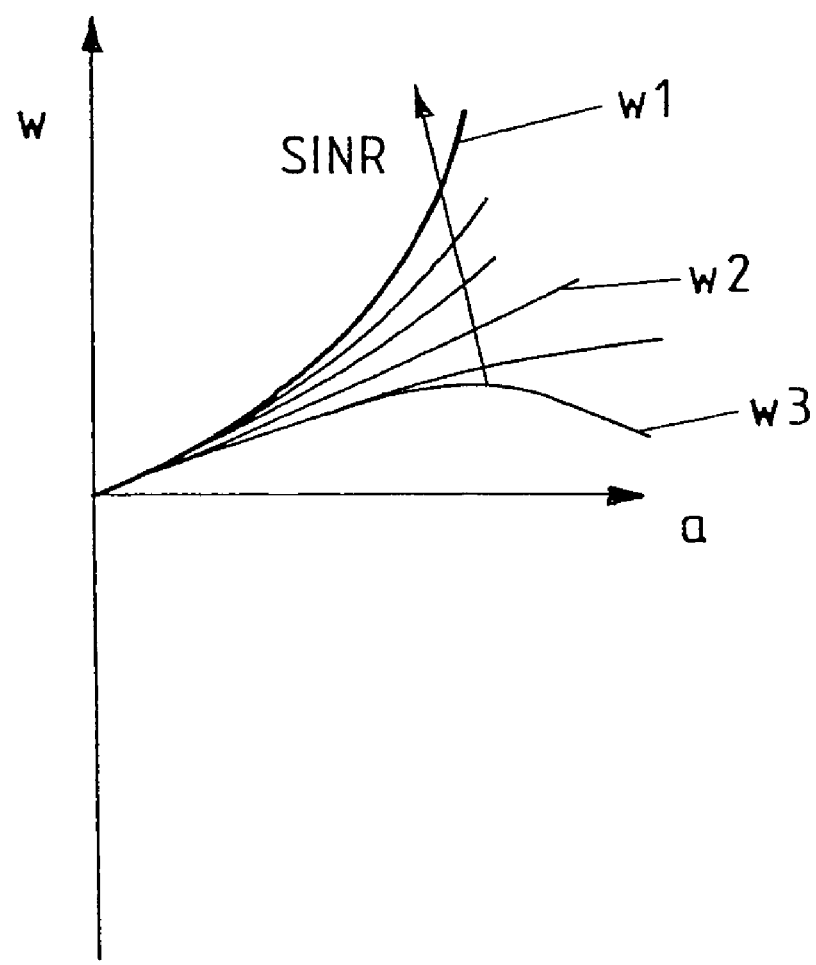
FIG. 3 is a plot of weighting functions for the adaptive adaptation for the system illustrated in FIG. 1 in QPSK operation.

FIG. 1 is a block diagram illustration of a first decoding system 1 for decoding QPSK or QAM symbols. The decoding system 1 is suitable preferably for decoding QPSK symbols. However, the system can also be employed to decode M-level QAM symbols, for example for M=16, 64, or larger. However, to accomplish this parallel processing (not sequential signal processing, as utilized in the embodiments of FIG. 4 et seq.) is required.

In the decoding system 1 includes a circuit to decode QPSK or QAM symbols by a "hard" decision (hard-decision-output demapper) 2, a circuit 3 to determine the receive probability w for a bit, and a circuit 4 for additional weighting of the probability w by a factor G.

The hard-decision-output demapper 2 receives signal vectors r with coordinates I/Q on a line 100. The hard-decision-output demapper 2 provides an output HD (hard decision) on a line 102 to tap a so-called "hard" decision b. The hard-decision-output demapper 2 provides a second output on a line 104 to the circuit 3 to determine the receive probability w of a bit. An output of this circuit 3 on a line 106 is in turn connected to the circuit 4 to weight the receive probability by a factor G. The weighting circuit 4 provides an output SD (soft decision) on a line 108 from which "soft" decision information g can be tapped. The circuits 3, 4 have control inputs on a line 110 through which time-variant and, in the case of multicarrier systems, carrier-dependent information about the carrier energy S, noise energy N, and/or interference can be supplied.

The demapping procedure is described below for a QPSK constellation:

An input vector r, which has in-phase coordinate I and quadrature coordinate Q and is input on the line 100 to the hard-decision demapper 2, is assigned internally to an ideal symbol vector α and an associated bit sequence b. This bit sequence b is output from the hard-decision-output demapper 2 on the line 102. In addition, the Euclidean distance a of the received signal vector r relative to the decision threshold 7, 8, (FIGS. 2A and 2B) is determined within the hard-decision-output demapper 2. This value a subsequently undergoes a soft-decision procedure. In circuit 3, the value a on the line 104 is subjected to a demapping characteristic W, determined by the local noise energy N and/or the interference energy IF, as a function of the carrier energy S (which may be derived, for example, from a channel transfer function CTF). The result obtained by this operation is a receive probability value w output on the line 106 for the corresponding bit.

FIG. 3 illustrates an example of a family of curves for demapping characteristic W given different receive conditions. Whereas in response to high receive quality (high SINR) the probability w of a correct decision rises superproportionally with the increasing distance a (w1), given a low-level signal to interference and noise ratio SINR, the result is instead a linear relationship between a and w (w2), or in response to interferences, an actual decreasing probability w for larger distances a (w3). The thus generated output signal w, as in the present embodiment, is weighted by a quantity G as a function of carrier energy S and/or noise energy N and/or interference energy IF. The output quantity thus obtained is:

$$g = G * W(a)$$

The weighting factor G which may preferably be employed here is the ratio SINR of the instantaneous signal energy S relative to the sum of the instantaneous noise and interference energies N, IF for the associated channel.

Figure 4:
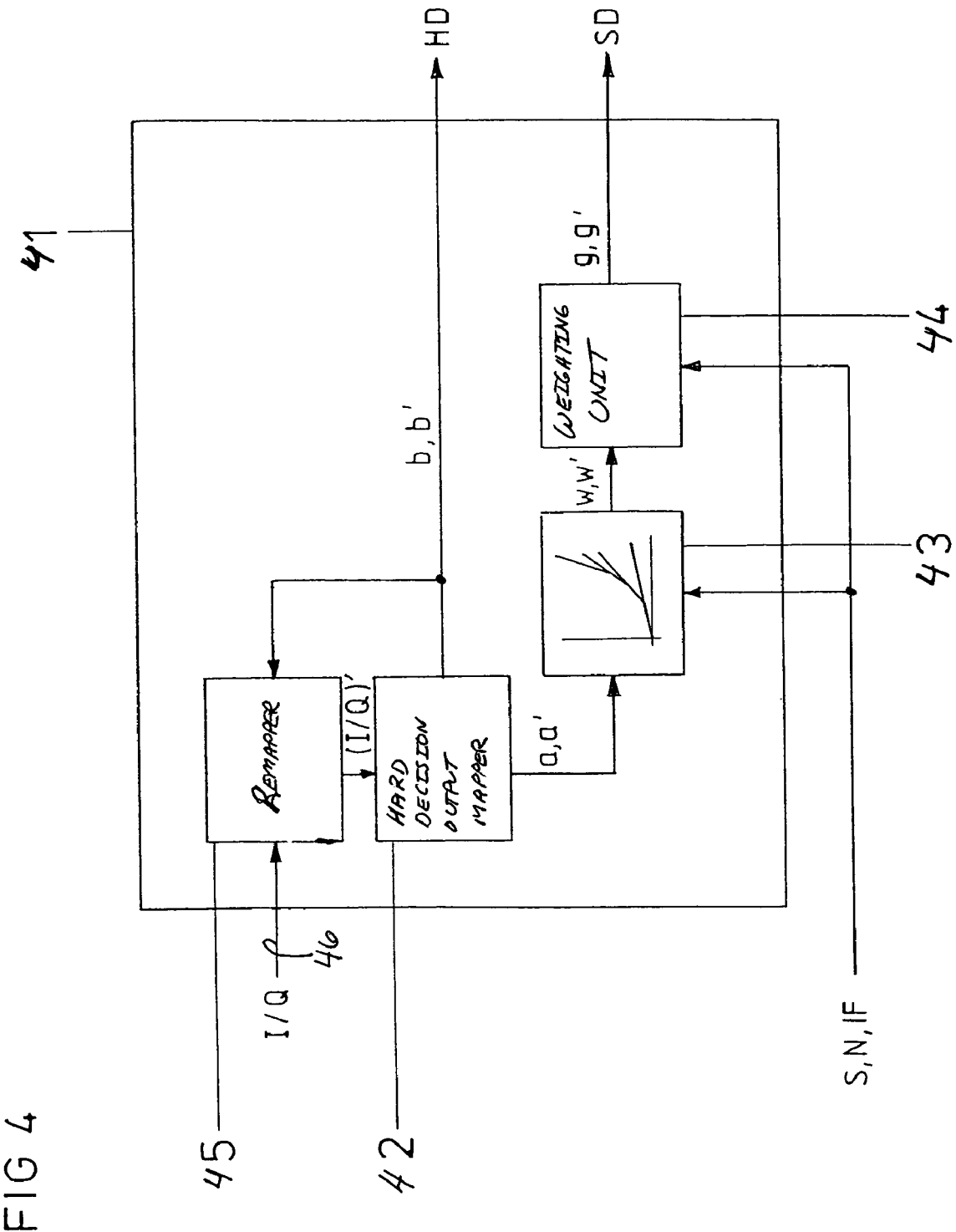
FIG. 4 is a block diagram illustration of a second system for decoding QPSK or QAM symbols (soft demapper)
Figure 5C:
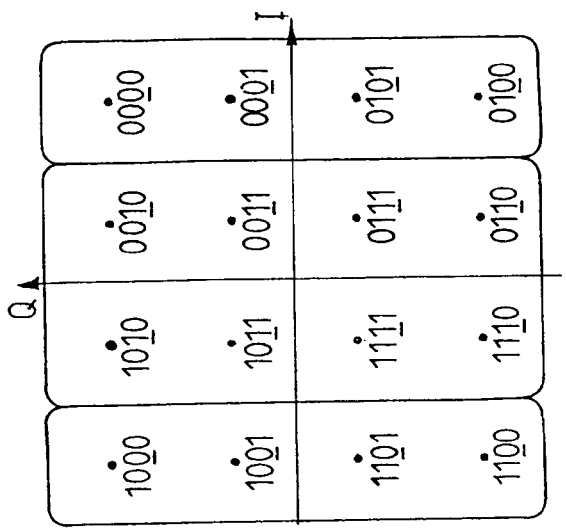
FIGS. 5A-5D illustrate partitions of the non-hierarchical 16-QAM constellation.
Figure 5D:
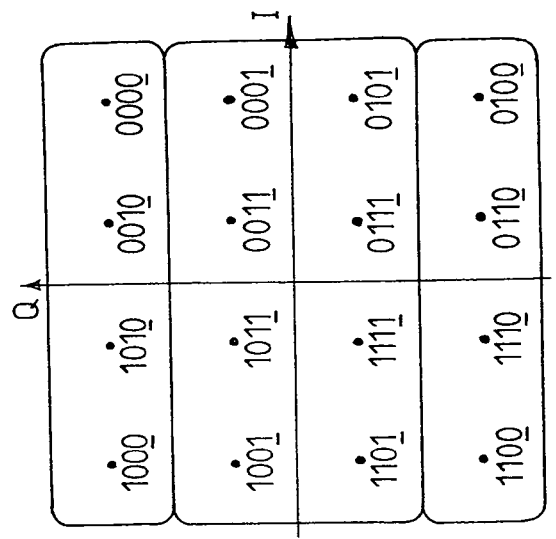
Figure 5A:
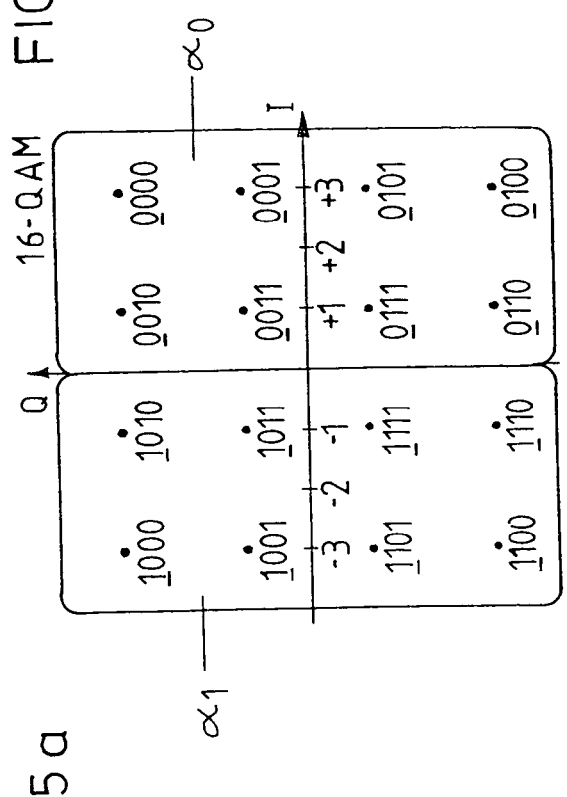
Figure 5B:
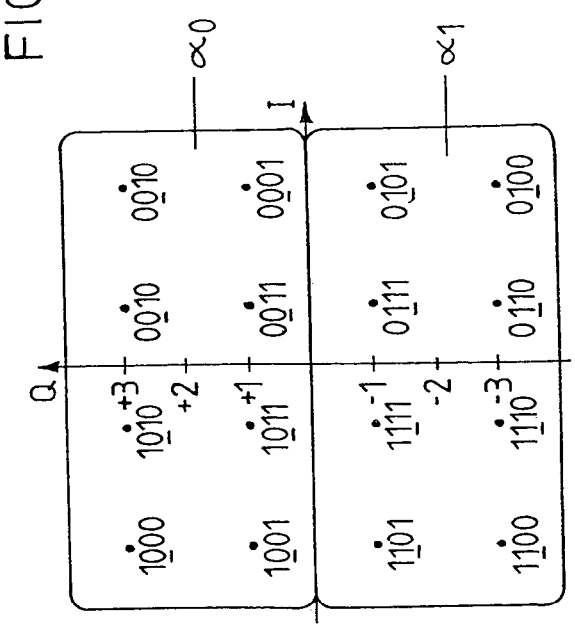

FIG. 4 is a block diagram illustration of a second decoding system 41. The decoding system 41 of FIG. 4 comprises a circuit 42 to decode QAM symbols based on a "hard" decision (hard-decision-output demapper), a circuit 43 to determine the receive probability w for a bit, and a circuit 44 for the additional weighting of the probability w by a factor G, as well as a remapper 45 to rearrange QAM symbols. The remapper 45 for rearranging QAM symbols receives the hard-decision-output demapper 42.

The decoding of a signal vector is described below using the example of a 16-QAM constellation:

An input vector r on the line 46 with in-phase coordinate I and quadrature coordinate Q is supplied to the remapper 45 and resolved step-by-step into sub-constellations. In a first step, input vector r is passed directly on to the hard-decision-output demapper 42. The hard-decision-output demapper 42 makes a hard decision by assigning the receive vector r to the two most-significant bits $b_h$ of the closest ideal symbol vector α. The soft information is determined in a procedure analogous to that described for QPSK.

After the initial hard decision, only a subset of possible ideal symbol vectors a remain. This remaining sub-constellation is selected in the remapper 45. Through appropriate transformation, this sub-constellation is transformed to a constellation symmetrical with the origin. This transformation involves a shift and, as necessary, a subsequent reflection.

If one starts with a non-hierarchical 16-QAM constellation as found, for example, in FIG. 5, the result may be the transformations shown in FIGS. 6 and 7.

If one assumes that, as in FIG. 6, the symbol vectors a in the first quadrant are selected as the sub-constellation, the transformation comprises a shift by the shift vector a1 and by the shift vector b1.

If one assumes that, as in FIG. 7, the symbol vectors a in the third quadrant are selected as the sub-constellation, the transformation comprises a shift by the shift vector a2, a shift by the shift vector b2, and two reflections c2 and d2.

Figure 10:
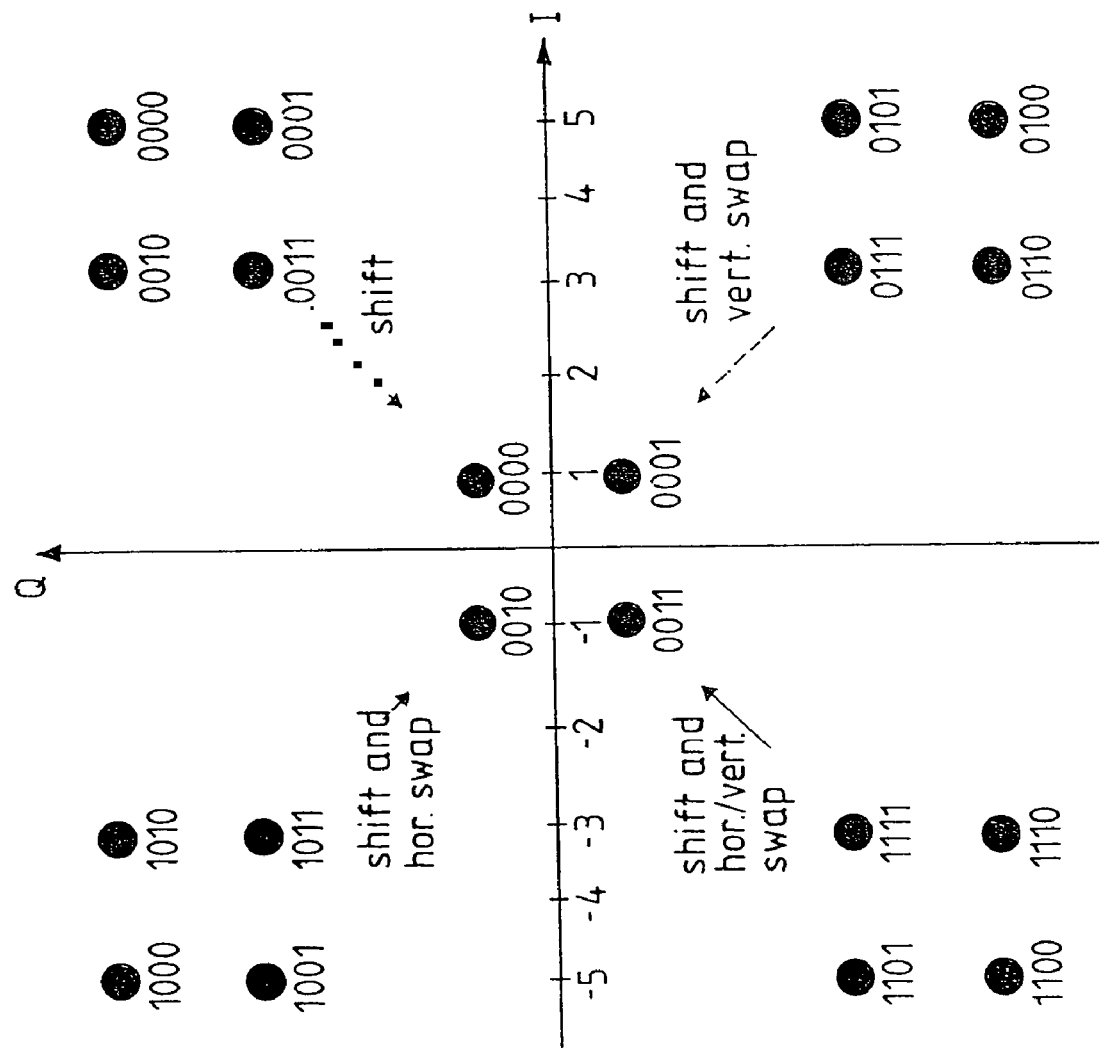
FIG. 10 illustrates coordinates for the QAM symbols of a hierarchical 16-QAM constellation and the remapping thereof.

If one starts with a hierarchical 16-QAM constellation, the result may be, for example, the transformation shown in FIG. 10. As compared with the non-hierarchical case, only the shift vector changes here.

To implement the decision of the least significant bit, the receive vector r' transformed into this constellation with in-phase coordinate I' and quadrature coordinate Q' is supplied to the input of the hard-decision-output demapper 42.

The transformed receive vector r' is assigned internally to a transformed ideal symbol vector α' and to an associated bit sequence b'. This bit sequence b' can be tapped as a hard decision at the output HD of hard-decision-output demapper 42.

In addition, within the hard-decision-output demapper 42, the Euclidean distance a' for the now transformed received signal vector r' is determined relative to the decision threshold 7, 8 used for hard decision b'—as shown in FIG. 2.

The value a' is once again subjected to a soft-decision procedure. Referring still to FIG. 4, in the circuit 43, a' is subjected to demapping characteristic W, determined by local noise energy N and/or interference energy IF, as a function of carrier energy S. The result obtained from this operation is a receive probability value w' for the corresponding bit.

The log-likelihood ratio (LLR), generally employed to determine the receive probability for a bit, is ideally a function of the in-phase coordinate I and the quadrature coordinate Q, and thus a two-dimensional function. FIG. 8A shows the log-likelihood ratios (LLR) for the most significant bit (MSB); FIG. 8B shows the log-likelihood ratios (LLR) for the least-significant bit (LSB) of a non-hierarchical 16-QAM constellation. As FIGS. 8A and 8B illustrate, the effect of quadrature coordinate Q for the decision in terms of in-phase coordinate I is extremely small, and may thus be neglected. As an approximation, the log-likelihood ratio (LLR) for in-phase coordinate I can be assumed to be the log-likelihood ratio with Q=0 (FIG. 9A).

The LLR characteristic for bits b of varying significance does vary considerably. However, it turns out that by appropriately shifting the individual characteristics for bits of different significance, a uniform overall characteristic is obtained which represents a sufficient approximation within the relevant control range (FIG. 9B).

This appropriate shift is implemented by the remapping procedure described above. As a result, a function that is uniform for all bits can be employed as demapping characteristic W, that is, the log-likelihood ratio (LLR) of the most significant bit MSB.

Figure 11:
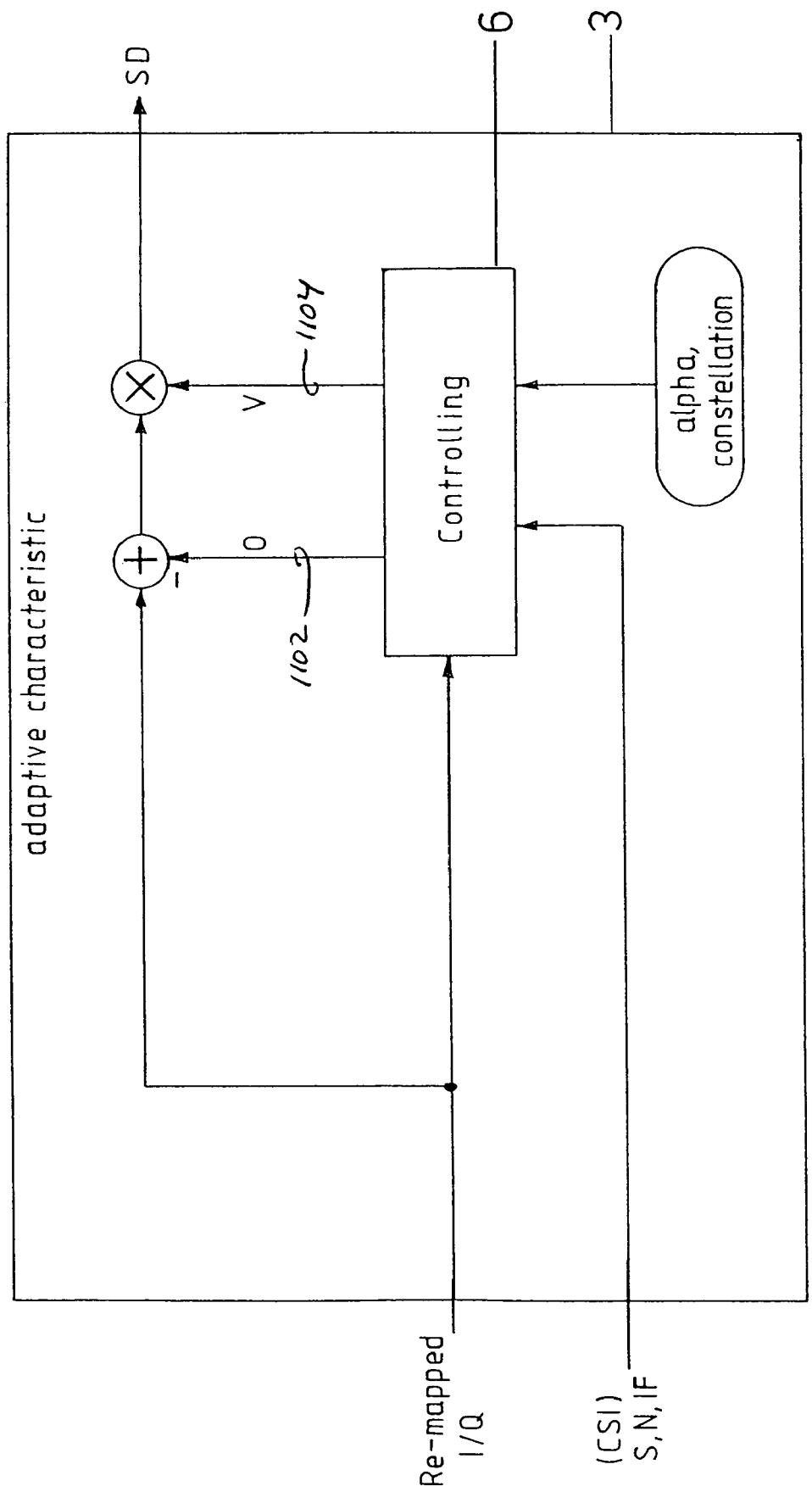
FIG. 11 is a block diagram illustration of an arithmetic unit for adaptively computing soft information.

The characteristic W may be implemented, for example, by combining linear segments. FIG. 11 illustrates a circuit that calculates the characteristic W using an offset correction value O and subsequent amplification value, V, on lines 1102 and 1104, respectively. The offset correction parameter value O and the amplification parameter V are preferably stored in a table in circuit 3 provided for the demapping procedure, and are selected by arithmetic unit 6 as a function of the constellation used, the hierarchy mode used, and the adaptation parameters signal energy S, noise energy N, and interference energy IF.

In this embodiment, output signal w' generated by the circuit 3 is also weighted by a quantity G dependent on the carrier energy S and/or the noise energy N and/or the interference energy IF. The output quantity obtained is:

$$g' = G * W(a')$$

The ratio SINR of the instantaneous signal energy S relative to the sum of the instantaneous noise and interference energies N, IF, of the associated channel may again be employed as the weighting factor G.

Figure 12:
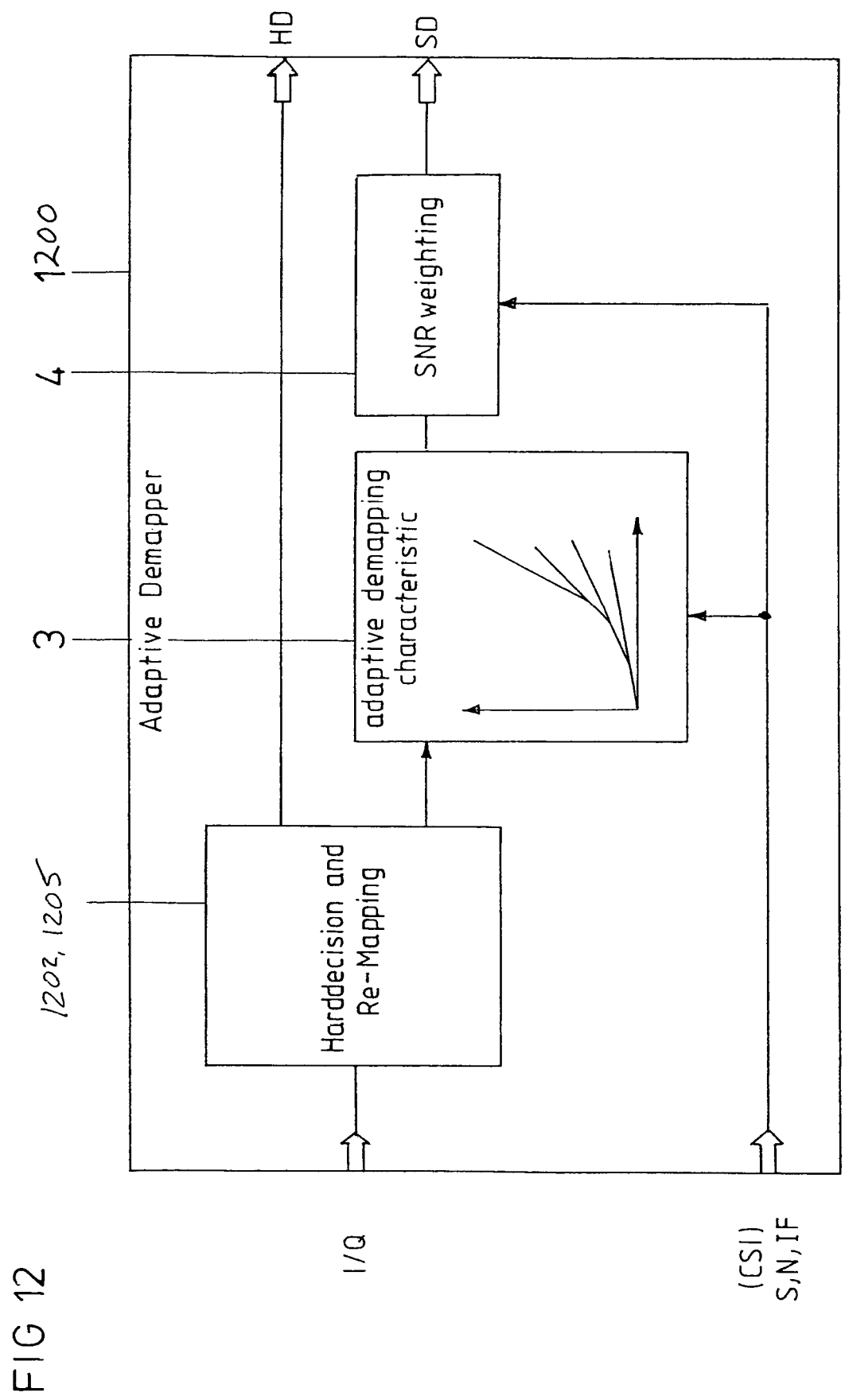
FIG. 12 is a block diagram illustration of a third embodiment for decoding QPSK or QAM symbols (soft demapper)

FIG. 12 is a block diagram illustration of yet another circuit 1200 for decoding QPSK or QAM symbols (soft demapper). In this embodiment, a hard-decision-output demapper 1202 and a remapper 1205 are combined. Otherwise, this circuit 1200 is substantially the same as the embodiments illustrated in FIGS. 1 and 4.

Figure 13:
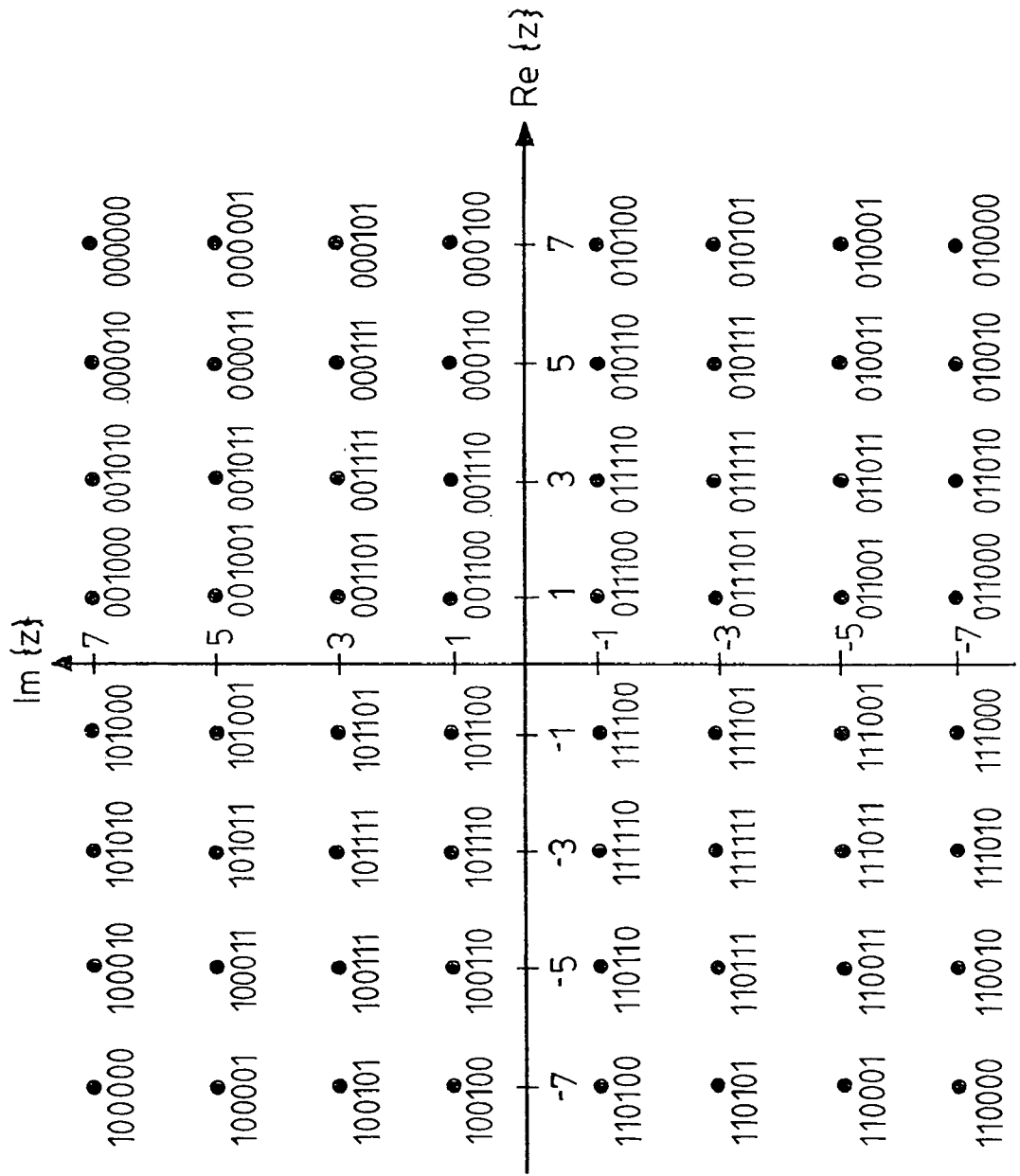
FIG. 13 illustrates symbol coordinates of a non-hierarchical 64-QAM constellation.
Figure 14B:
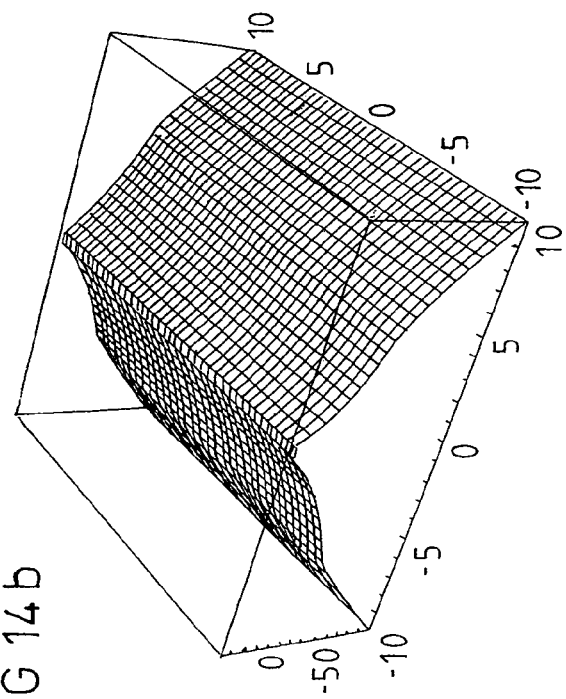
FIGS. 14A-14C illustrate the log-likelihood ratios LLR of the MSB (FIG. 14A), $2^{nd}$ SB (FIG. 14B), and the LSB (FIG. 14C), of the I coordinate of the non-hierarchical 64-QAM constellation in FIG. 13.
Figure 14A:
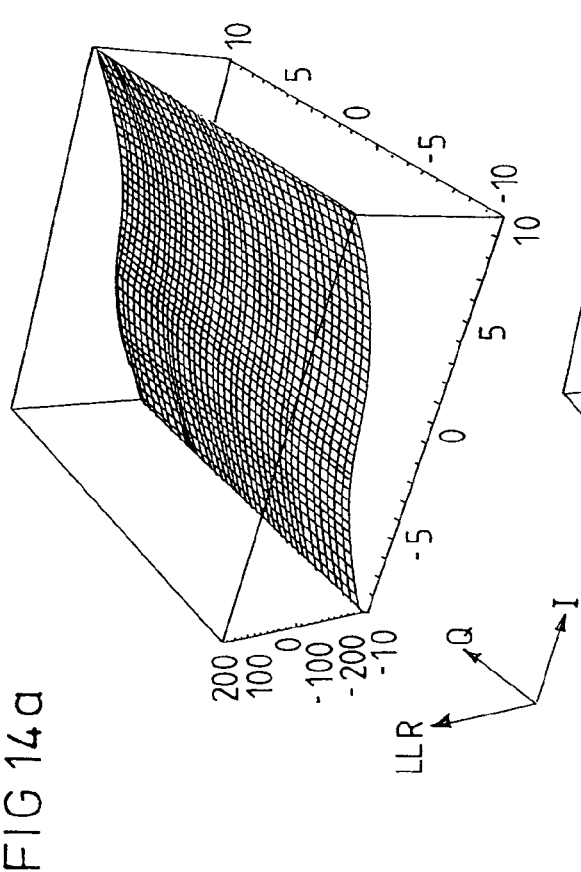
Figure 14C:
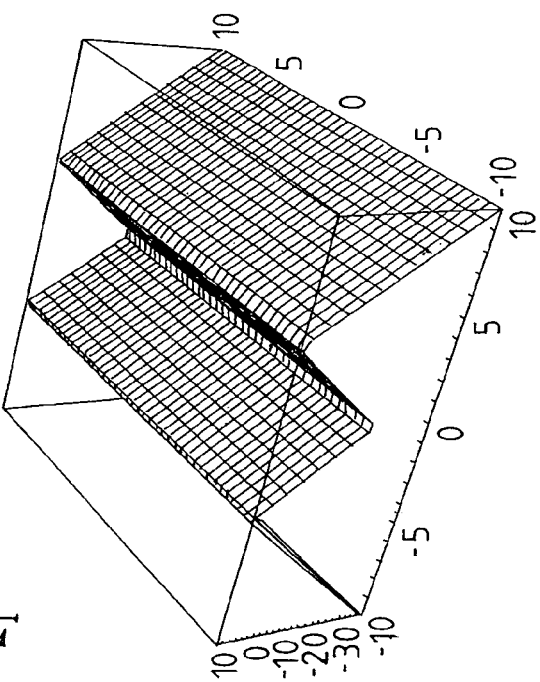
Figure 15:
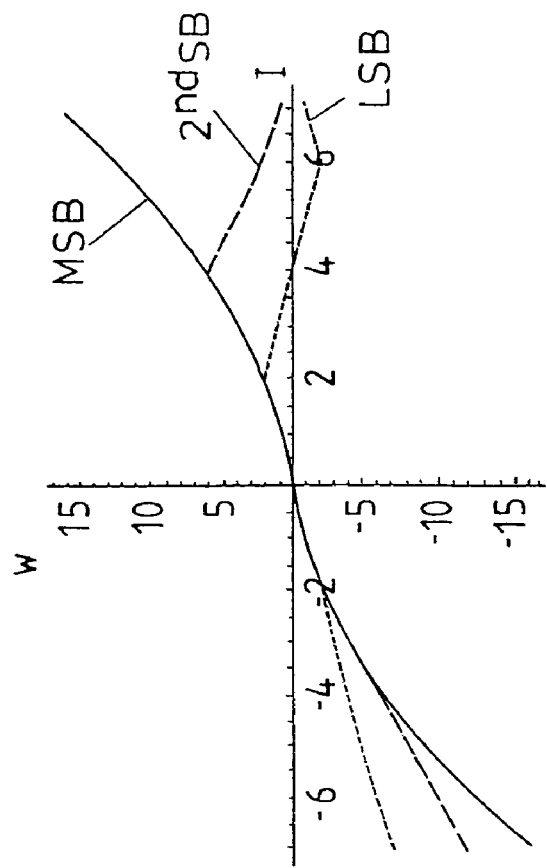
FIGS. 15A-15B illustrate a section of the functions of FIGS. 14A and 14B where Q=0 (FIG. 15A) and shift of the curves for low-order bits (FIG. 15B)
Figure 15:
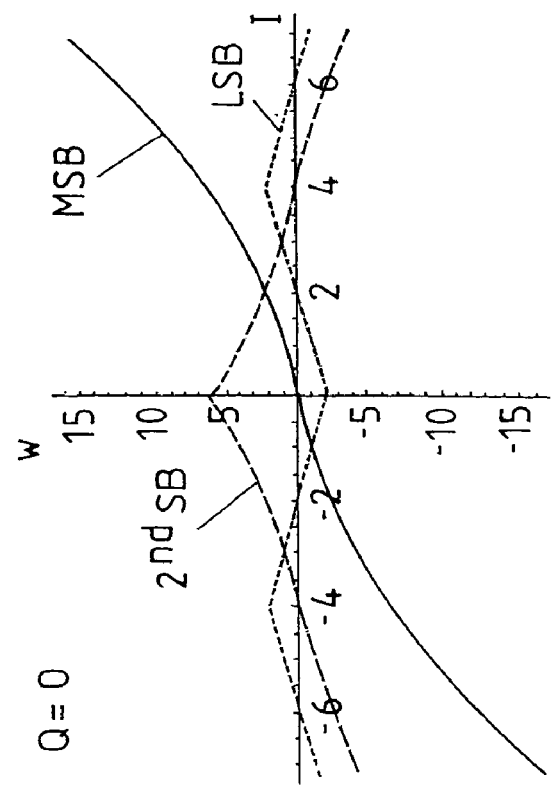

The combined de-/remapper 1202, 1205 may, first of all, be of similar design to that of the embodiment of FIG. 4, that is, by connecting remapper 5 on the input side of hard-decision-output demapper 2. This arrangement is also capable of decoding higher-level constellations, such as, for example, 64-QAM. To accomplish this, it is simply necessary to have additional iteration cycles of the above-described demapping and remapping procedure. For the sake of completeness, the diagrams corresponding to the diagrams for the non-hierarchical 16-QAM constellation of FIGS. 5-9 are shown in FIGS. 13-15 for the non-hierarchical 64-QAM constellation.

It is also possible to have the remapper 1205 connected on the output side of the demapper 1202, or to combine the remapper 1205 and demapper 1202 in a single circuit.

In addition, it is possible to implement the circuit 3 for determining the receive probability w of a bit and the circuit 4 for weighting receive probability w within a single circuit.

The following possibilities may be considered in regard to the control quantities S, N, IF for the adaptation of the circuits 3 and/or 4:

Case 1: Noise energy N is assumed to be constant; only signal energy S is determined from channel transfer function (CTF): S~abs(CTF)$^2$; interference IF is neglected.

Case 2: Noise energy N is a function of carrier i; signal energy S is determined from channel transfer function CTF: S~abs(CTF)$^2$, interference IF is neglected.

Case 3: Noise energy N is constant; signal energy S is determined from channel transfer function CTF: S~abs(CTF)$^2$; interference IF is determined for each carrier, or possibly estimated.

Case 4: noise energy N is a function of carrier i; signal energy S is determined from channel transfer function CTF: S~abs(CTF)$^2$; interference IF is determined for each carrier, or possibly estimated.

Although the present invention has been shown and described with respect to several preferred embodiments thereof, various changes, omissions and additions to the form and detail thereof, may be made therein, without departing from the spirit and scope of the invention.

What is claimed is:

1. A method of decoding a bit sequence (b, b') in a decoder system from QPSK or QAM symbols received following transmission over a channel, in which an associated receive probability (w, w') is assigned to each receive bit (b, b'), the method performed in a decoder comprising:

adaptively determining the receive probability (w, w') as a function of the transfer properties of the channel; and weighting the receive probability (w, w') with an adaptive weighting value set as a function of the channel transfer properties, where the function is indicative of a signal to noise and interference ratio;

wherein the step of adaptively determining the receive probability (w, w') comprises determining the receive probability as a function of carrier energy (S), noise energy (N), and the interference energy (IF).

2. The method of claim 1, comprising estimating channel transfer properties when determining the receive probability (w, w') for each carrier (i).

3. The method of claim 1, wherein decoding of bits (b, b') of differing significance is implemented sequentially.

4. A method of decoding a bit sequence (b, b') in a decoder system from QPSK or QAM symbols received following transmission over a channel, in which an associated receive probability (w, w') is assigned to each receive bit (b, b'), the method performed in a decoder comprising:

adaptively determining the receive probability (w, w') as a function of the transfer properties of the channel;

weighting the receive probability (w, w') with an adaptive weighting value set as a function of the channel transfer properties, where the function is indicative of a signal to noise and interference ratio;

wherein the step of adaptively determining the receive probability (w, w') comprises determining the receive probability as a function of carrier energy (S), noise energy (N), and the interference energy (IF); and wherein to determine the receive probability for low-order bits, higher-level constellations are transformed into constellations of lower level, and that for bit significances a uniform function is employed to determine the receive probability.

5. A method of decoding a bit sequence (b, b') in a decoding system from QPSK or QAM symbols, in which an associated receive probability (w, w') is assigned to each receive bit (b, b'), the method performed in a decoder comprising:

transforming higher-level constellations into constellations of lower level; and shifting characteristics for bits of different significance from the lower level constellation such that a uniform function or characteristic is obtained representing an approximation of both most and least significant bits;

determining the receive probability for bit significances using the uniform function or characteristic.

6. An apparatus for decoding a bit sequence containing QPSK or QAM symbols, said apparatus comprising:

a hard decision output mapper that receives the bit sequence and provides a hard decision output signal and a Euclidean distance signal indicative of the bit sequence relative to a decision threshold;

a soft decision logic unit that receives and processes the Euclidean distance signal to provide a receive probability signal for the bit sequence as a function of carrier energy (S), noise energy (N), and the interference energy (IF); and a weighting unit that weights the receive probability signal by applying a function indicative of a signal to noise and interference ratio, and provides a weighted receive probability signal.

7. A method of decoding a bit sequence (b, b') in a decoder system from QPSK or QAM symbols received following transmission over a channel, in which an associated receive probability (w, w') is assigned to each receive bit (b, b'), the method performed in a decoder comprising:

adaptively determining the receive probability (w, w') as a function of the transfer properties of the channel; and weighting the receive probability (w, w') with an adaptive weighting value set as a function of the channel transfer properties, where the function is indicative of a signal to noise and interference ratio;

wherein the step of adaptively determining the receive probability (w, w') comprises determining the receive probability as a function of carrier energy (S) and noise energy (N).

8. A method of decoding a bit sequence (b, b') in a decoder system from QPSK or QAM symbols received following transmission over a channel, in which an associated receive probability (w, w') is assigned to each receive bit (b, b'), the method performed in a decoder comprising:

adaptively determining the receive probability (w, w') as a function of the transfer properties of the channel; and weighting the receive probability (w, w') with an adaptive weighting value set as a function of the channel transfer properties, where the function is indicative of a signal to noise and interference ratio;

wherein the step of adaptively determining the receive probability (w, w') comprises determining the receive probability as a function of at least two of carrier energy (S), noise energy (N), and the interference energy (IF).

* * * * *